2,779,796

DECOBALTING OF OXO PRODUCTS WITH LIVE STEAM

Stanley H. Munger, Wilmington, Del., assignor to E. I. du Pont de Nemours and Company, Wilmington, Del., a corporation of Delaware No Drawing. Application November 2, 1950, Serial No. 193,752

6 Claims. (Cl. 260—604)

This invention relates to a process for preparing improved oxygenated products. More particularly, it relates to a process wherein aldehydic or alcoholic compositions resulting from the reaction of olefinic compounds with carbon monoxide and hydrogen are treated in such a way as to improve them for use in subsequent operations. In a particular embodiment, it relates to a process for improving crude nonyl aldehyde or nonyl alcohol compositions resulting from the hydrocarbonylation of diisobutylene.

It is known that olefinic compounds may be reacted with carbon monoxide and hydrogen at elevated temperatures and pressures to produce oxygenated compounds and that this reaction can be controlled in such a way that the mixture of compounds obtained consists predominantly of either aldehydes or alcohols. The aldehydes and alcohols produced generally contain one more carbon atom than the olefinic compound employed as a starting material. It is also known that cobalt is an excellent catalyst for these hydrocarbonylation reactions. The cobalt catalyst may be employed, for instance, either in the form of cobalt carbonyl, or in the form of cobalt salts which are insoluble in the reaction mixture, or in the form of cobalt salts which are soluble therein. Examples of the latter type of catalyst are cobalt acetate, cobalt propionate, cobalt formate, cobalt nonanoate, cobalt stearate, cobalt oleate, cobalt palmitate, cobalt linoleate, cobalt naphthenate, and the like. Such catalysts may be soluble in the olefinic compound itself, as where cobalt naphthenate, for instance, is dissolved in diisobutylene. Alternately, they may be soluble in another reaction ingredient, as where water is injected along with the olefinic compound and cobalt acetate, which is soluble in water, is employed as the catalyst.

Although these cobalt catalysts have given excellent results insofar as the hydrocarbonylation step itself is concerned, the aldehydic and alcoholic compositions produced thereby have been characterized by poor stability, particularly when it was attempted to purify them or to employ them in subsequent chemical operations.

In accordance with this invention, it has been discovered that this poor stability is attributable to the presence of certain soluble, and for the most part volatile, forms of cobalt remaining in the compositions. It has been found that, by decomposition or removal of the major portion of these soluble cobalt compounds, the aldehydic and alcoholic compositions can thereafter be purified, as by distillation, or subjected to subsequent chemical operations, without incurring any of the undesirable degradation, side-reactions, or polymerizations, or any of the extensive fouling of processing equipment encountered heretofore.

According to this invention, we provide a process which comprises reacting a hydrocarbon compound containing an olefinic linkage, at elevated temperatures and pressures and in the presence of a cobalt catalyst, with carbon monoxide and hydrogen to form a crude oxygenated product, and thereafter treating said crude product with live steam to remove the soluble cobalt compounds from solution therein, as by decomposition or precipitation, while avoiding any contact of said crude product during this steam treatment with any fixed heating surface the temperature of which exceeds the boiling point of water/product mixture.

The live steam treatment may be carried out at atmospheric pressure, or at subatmospheric pressure, or at superatmospheric pressure. For instance, a pressure of from about atmospheric to about 60 atmospheres may be employed, or a pressure between 0 and 200 pounds per square inch gauge may be employed. Preferably, pressures very close to atmospheric are employed.

The temperature of the live steam will depend to some extent on the pressure employed, i. e., the temperature must be at least high enough to maintain the bulk of the steam in the vaporous state prior to its coming in contact with the oxygenated product. If desired, superheated steam may be employed. Steam temperatures in the range of 212° to 400° F., for instance, are useful. The temperature of the crude oxygenated product during the steam treatment will vary, of course, depending upon the nature of the product itself and upon the pressure employed. For example, when treating a crude aldehydic reaction product containing aldehydes having from six to ten carbon atoms to the molecule, temperatures of from about 80° to 160° C. may be employed. Preferably, the temperature of the crude product during the live steam treatment is maintained within 10° C. of the boiling point of the water/product mixture.

Hydrocarbon compounds which contain an olefinic linkage and which are suitable for use in the process of this invention include the straight- and branched-chained olefins and diolefins such as ethylene, propylene, butylenes, pentenes, hexenes, heptenes, octenes, nonenes, decenes and their homologues and analogues, butadiene, pentadiene, styrene, olefin polymers such as diisobutylene, triisobutylene, and hexene and heptene dimers, polypropylenes, olefinic fractions from the hydrocarbon synthesis process, thermal or catalytic cracking operations and other sources of hydrocarbon fractions containing olefins, etc.

According to a preferred embodiment of the invention, the olefinic hydrocarbon employed is diisobutylene. In this case, if aldehyde-forming conditions are employed, the product consists predominately of the single nonyl aldehyde, 3,5,5-trimethylhexanal, and if alcohol-forming conditions are employed, it consists predominately of the corresponding nonyl alcohol, 3,5,5-trimethylhexanol-1.

According to an important feature of the invention, the live steam treatment is carried out while avoiding any contact of the crude oxygenated product with any fixed heating surface the temperature of which exceeds the boiling point of the water/product mixture. Preferably, all of the heat used to decompose the cobalt catalyst is supplied by the live steam and no heat is introduced by means of heating coils or other fixed heating surfaces, because the cobalt has a tendency to deposit on any such surfaces, thus greatly decreasing their ability to transfer heat.

Preferably, the live steam treatment is continued until at least 90% of the cobalt originally present in the crude product has been removed from solution in the organic layer. The bulk of this cobalt will be in the form of a precipitate, although some of it may be partially dissolved in the aqueous layer. Also, if the live steam treatment is carried out at about the boiling point of the mixture, it may be desirable to reflux to the treating zone the main portion of any material which may distill over.

This live steam treatment results in the precipitation of most of the cobalt remaining in the crude oxygenated products. The cobalt generally precipitates in the form of a fine powder which, on settling, tends to accumulate in the aqueous layer. After separation of the aqueous and organic layers, the precipitated cobalt may be recovered, for example, by filtration of the aqueous layer and/or the organic layer, by centrifuging, by allowing the precipitate to settle and then decanting, or by other known means. The recovered cobalt may be reconverted to fatty acid salts of cobalt, or to cobalt carbonyl, for instance, and then used over again as the catalyst in the initial reaction step.

For other purposes, as for example where the crude composition is to be purified by steam distillation, it is not necessary to remove the precipitated cobalt prior to the distillation, since the precipitate remains in the aqueous residue during the distillation and can be removed therewith without adhering to any of the distillation equipment.

The live steam treatment can be carried out by passing the steam, or a gas containing steam, into a stirred vessel or autoclave. Alternately, streams of steam and crude oxygenated product may be mixed together in an area of turbulent flow, as in a tubular mixer, and thereafter passed to a separator. The volatile gases given off during the treatment may be removed overhead.

After the cobalt compounds have been decomposed or precipitated in accordance with this invention, the resulting oxygenated product may be subjected to a purification treatment, or it may be subjected to additional chemical reactions. The purification may be carried out, for instance, by means of a steam distillation or a vacuum distillation. According to a preferred feature of the invention, the separated crude aldehyde composition may first be steam distilled to remove any remaining hydrocarbons, after which it is subjected to another distillation, under vacuum if desired, to recover the pure aldehyde overhead. The hydrocarbons separated from the crude oxygenated product are advantageously recycled to the initial reaction zone. Any unreacted olefins therein are thus recovered and used over again. Recycling of the saturated hydrocarbons produced as a side reaction serves to direct the primary reaction in such a way as to produce higher yields of the desired oxygenated products. The water layer also may be subjected to steam distillation to recover any aldehyde it may contain. If desired, the live steam treatment and the subsequent steam distillation to remove hydrocarbons may be combined into a single operation, in which case an appreciable portion of the steam and hydrocarbons taken overhead is condensed and not returned to the treating zone.

The olefin/carbon monoxide/hydrogen reaction may be carried out at temperatures of at least 75° C. and at a pressure in excess of 75 atmospheres. Pressures in the range of 100 to 300 atmospheres, and in particular pressures in excess of 325 atmospheres, are preferred. The temperature used will depend upon the olefinic reactant employed and upon whether it is desired to prepare predominately aldehydes or predominately alcohols, higher temperatures being employed when it is desired to produce alcohols. The mol ratios of olefinic compound:CO:$H_2$ may be varied videly and are generally known in the art.

The process whereby the aldehydic compositions are treated with live steam has many important and unexpected advantages. When the aldehydic composition is that resulting from the hydrocarbonylation of diisobutylene, the amount of steam required may vary from about 0.1 to 0.5 pound per pound of crude product. The temperature employed in the steam treatment varies from about 80° to 87° C., this being the boiling range of the crude nonyl aldehyde/water mixture. After treatment with live steam for a period of about an hour, the cobalt originally contained in the aldehydic composition is largely precipitated in a very finely divided form. This precipitate forms an aqueous emulsion which accumulates at the interface between the organic and water layers. Separation of the layers occurs rapidly, and the precipitate may then be removed with the aqueous layer. Over relatively longer periods of operation, this emulsion becomes more concentrated in solids, whereupon parts of the cobalt precipitate break loose and sink to the bottom of the apparatus. The amount of time allowed for precipitation and separation of the cobalt can be much shorter than one hour, particularly where recovery of the cobalt is not contemplated.

It is important that all of the heat required for bringing about this catalyst removal be supplied by the live steam. If heat is supplied from outside sources, as for instance by heat coils, the cobalt will deposit, and sometimes will plate out in the form of a mirror, on the heat transfer surface, regardless of whether or not water or steam is present. The precipitate which forms on such heat transfer surfaces is very adherent and difficult to remove. Fouled heat transfer surfaces of this nature greatly decrease the rate of heat transfer and necessitate such frequent shut-downs that commercial operation becomes uneconomical.

Although it is possible to effect precipitation of the cobalt catalyst by merely heating the nonyl aldehyde compositions in the absence of water or steam, the higher temperatures (100° to 110° C.) and longer hold-up times which are required give rise to a much greater loss of aldehyde. The presence of the steam lowers the temperature at which the cobalt precipitates and thus greatly decreases, or eliminates entirely, the degradation of the aldehyde.

*Example 1.*—Nonyl aldehyde is synthesized by the hydrocarbonylation of diisobutylene with hydrogen and carbon monoxide in the presence of a soluble cobalt catalyst at 200° to 225° C. and 10,000 p. s. i. The cobalt is introduced by dissolving the relatively stable cobalt naphthenate in diisobutylene. Air is excluded from the crude hydrocarbonylation product by an inert gas blanket to avoid rapid oxidation of aldehyde to acid. The cobalt is removed from the crude hydrocarbonylation product prior to aldehyde refining to avoid cobalt precipitation and fouling of the first column. The procedure involves precipitation by refluxing fresh crude hydrocarbonylation products with live steam in a stirred vessel, followed by cooling and separation of water containing the precipitated cobalt in a decanter. The following conditions are employed.

Temperature_____ 80 to 87° C.
Hold-up time:
  Precipitation tank_____ 1 hour.
  Decanter_____ ½ hour.
Steam requirement_____ 0.3 lb./lb. crude product.
Condenser temperature_____ 80° C.
An inert gas blanket is used.

This combination of heating and vapor stripping decomposes the cobalt compound or compounds to an insoluble form which precipitates to form a slurry. The dry precipitate contains 50 to 70% cobalt, which is frequently strongly magnetic. The organic materials separate as an upper layer essentially free of cobalt.

This method results in substantially complete removal of cobalt from solution in the fresh crude product with negligible degradation of aldehyde. The treated crude is steam distilled in a continuous column with no signs of fouling. The precipitate shows no tendency to adhere to solid surfaces even if introduced directly into the column without a settling step. This is in contrast with the hard adherent coating which causes rapid plugging when the crude product, without any preconditioning, is subjected to vacuum distillation, for instance. Separation of layers in the decanter is fairly rapid, with the solid precipitate accumulating at the interface as an emulsion. Over long periods of operation this emulsion becomes more concentrated in solids and eventually parts break loose and sink to the bottom of the decanter.

The cobalt precipitate is removed from the decanter continuously with the water layer and stored prior to recovery of the last traces of organic materials from the water by distillation. If it is desired to minimize the settling time, some or all of the precipitate can be fed to the bubble cap column along with the waste water. Inspection after 12 weeks of such operation showed no appreciable accumulation of solids in the column.

The aldehydic compositions, after removal of the cobalt catalyst, can easily be distilled without giving rise to any problem of fouled heat transfer surfaces. For example, steam distillation of a crude nonyl aldehyde composition results in essentially 100% aldehyde recovery, without causing any polymerization or other undesirable side-reactions, which are apparently catalyzed by the presence of the cobalt. Furthermore, once the cobalt has been removed from these crude aydehydic compositions, they may be subjected to other chemical operations without giving rise to the difficult chemical and engineering problems which have plagued prior workers in this field. For example, crude nonyl aldehyde compositions, from which the remaining cobalt catalyst has been removed, may be catalytically hydrogenated to give substantially quantitative conversion of the nonyl aldehyde to the commercially important compound, nonyl alcohol (3,5,5-trimethylhexanol-1). This is in sharp contrast to the difficulties encountered by prior workers when they attempted the direct hydrogenation of the crude aldehydic compositions of this type.

When the hydrocarbonylation step is operated in such a way as to produce an alcoholic, rather than an aldehydic, composition, the process of this invention is likewise an extremely valuable and effective method of preventing the deposition of the cobalt on the equipment employed in subsequent operations. This operation is described below in connection with the purification of a crude nonyl alcohol composition.

*Example 2.*—Diisobutylene, containing about 0.05% of cobalt as cobalt naphthenate, is continuously reacted with carbon monoxide and hydrogen in the presence of 0.5 mol of water per mol of diisobutylene to form nonyl alcohol in a one-step process. The ratio of hydrogen to carbon monoxide is 1.2:1 and the ratio of hydrogen plus carbon monoxide to diisobutylene is 4.0:1. The water serves to reduce formation of by-product nonyl formate and high-boiling compounds. The reactants are processed at 1000 atmospheres pressure in a tubular, lined converter at about 200° C. in a first temperature stage and at about 280° C. in a second temperature stage. In the first stage, diisobutylene is converted to nonyl aldehyde and in the second stage, the aldehyde is converted to the corresponding alcohol, 3,5,5-trimethylhexanol-1. The soluble catalyst in the crude product is decomposed and precipitated by refluxing with live steam. The crude product is introduced and withdrawn continuously from an agitated copper vessel in which active boiling at 87° C. is maintained by sparging open steam through the mixture. Vapors are condensed and returned and a small quantity of evolved gas is vented off. Hold-up time is about one hour. The effluent is cooled and sent to a mild steel decanter in which settling of the precipitated catalyst into the water layer also occurs. The crude product is thereafter subjected to batch distillation in order to prepare pure 3,5,5-trimethylhexanol-1, which is obtained in about 60% to 70% over-all yield, based on diisobutylene.

Materials of construction suitable for operation of the process of this invention are known to those skilled in the art. When treating with live steam, copper construction is preferred, but many other materials are also suitable.

The cobalt in the crude hydrocarbonylation products may exist in one or more of the following forms: cobalt tricarbonyl, cobalt tetracarbonyl, dicobalt octacarbonyl $[Co_2(CO)_8]$, cobalt carbonyl hydrides, and salts of organic acids such as nonanoic, naphthenic, formic, where the cobalt exists in different states of oxidation. It is believed that the cobalt is converted by heat first to a black insoluble composition of the formula $[Co(CO)_3]_4$, which is converted by further heat to the free metal and carbon monoxide. The presence of water under the conditions here disclosed apparently alters this reaction in such a way that these materials do not plate out on the reaction equipment. It is to be understood, however, that applicant is not to be bound by any theory as to the form of the cobalt or as to why his process is effective.

The advantages of this invention are of the greatest importance in connection with the manufacture of nonyl aldehyde and nonyl alcohol. The invention is also important, however, in connection with the manufacture and use of other aldehydes and alcohols resulting from the hydrocarbonylation of olefins such as ethylene, propylene, isobutylene, hexenes, heptenes, octenes, polypropylenes, triisobutylene, and the like.

The present discovery may also be applied to processes in which esters are the reaction product, as where an olefin such as propylene is reacted with carbon monoxide and methanol, using a soluble cobalt catalyst, to give an ester such as methyl butyrate.

I claim:

1. A process which comprises reacting a hydrocarbon compound containing an olefinic linkage, at elevated temperatures and pressures and in the presence of a cobalt catalyst, with carbon monoxide and hydrogen to form a crude oxygenated product containing soluble cobalt compounds, and thereafter treating said crude product with live steam to remove soluble cobalt compounds from solution therein, while avoiding any contact of said crude product during this steam treatment with any fixed heating surface the temperature of which exceeds the boiling point of the water/product mixture.

2. A process which comprises reacting a hydrocarbon compound containing an olefinic linkage, at elevated temperatures and pressures and in the presence of a cobalt catalyst, with carbon monoxide and hydrogen to form a crude oxygenated product containing soluble cobalt compounds, treating said crude product with live steam at about atmospheric pressure to remove soluble cobalt compounds from solution therein, while avoiding any contact of said crude product during this steam treatment with any fixed heating surface the temperature of which exceeds the boiling point of the water/product mixture, and thereafter recovering a purified oxygenated compound by distillation from the crude product.

3. A process which comprises reacting a hydrocarbon compound containing an olefinic linkage, at elevated temperatures and pressures and in the presence of a cobalt catalyst, with carbon monoxide and hydrogen to form a crude oxygenated product containing soluble cobalt compounds, and thereafter treating said crude product with live steam until at least 90% of the cobalt originally present in said crude product has been removed from solution therein, while avoiding any contact of said crude product during this steam treatment with any fixed heating surface the temperature of which exceeds the boiling point of the water/product mixture, while maintaining the average temperature of said product within 10° C. of the boiling point of the water/product mixture and while refluxing to the treating zone the main portion of any material which may distill during said treatment; allowing the precipitated cobalt to accumulate in the aqueous layer, and separating said cobalt-containing aqueous layer from the organic layer.

4. A process which comprises reacting a hydrocarbon compound containing an olefinic linkage, at elevated temperatures and pressures and in the presence of a cobalt catalyst, with carbon monoxide and hydrogen to form an aldehydic composition containing soluble cobalt compounds, treating said crude product with live steam to remove soluble cobalt compounds from solution therein, while avoiding any contact of said crude product during this steam treatment with any fixed heating surface the temperature of which exceeds the boiling point of the water/product mixture, steam distilling to remove hydrocarbons from the crude product, and subsequently hydrogenating the aldehydes contained in the composition from which soluble cobalt compounds have been removed.

5. A process which comprises reacting diisobutylene, at a temperature in excess of 75° C., at a pressure of at least 75 atmospheres, and in the presence of a cobalt catalyst, with carbon monoxide and hydrogen to form a crude oxygenated product containing soluble cobalt compounds, and thereafter treating said crude product with live steam to remove soluble cobalt compounds from solution therein, while avoiding any contact of said crude product during this steam treatment with any fixed heating surface the temperature of which exceeds the boiling point of the water/product mixture.

6. A process which comprises reacting diisobutylene, at a temperature of at least 75° C., at a pressure in excess of 325 atmospheres, and in the presence of cobalt naphthenate as a catalyst, with carbon monoxide and hydrogen to form a composition predominating in nonyl aldehyde, treating the resulting crude nonyl aldehyde composition with live steam at about atmospheric pressure in a stirred vessel, while avoiding any contact of said crude composition during this steam treatment with any fixed heating surface the temperature of which exceeds the boiling point of the water/composition mixture, maintaining the average temperature of said composition during this steam treatment within the range of from 77° C. to 87° C., all of the heat supplied to said composition being derived from said live steam, refluxing to the treating zone the main portion of any material which may distill during said steam treatment, continuing this steam treatment until at least 90% of the cobalt originally present in the crude nonyl aldehyde composition has been removed from solution therein, separating the cobalt-containing aqueous layer from the organic layer, subjecting the organic layer to steam distillation to remove hydrocarbons therefrom, thereafter vacuum distilling to recover purified nonyl aldehyde overhead, and catalytically hydrogenating said purified nonyl aldehyde to produce nonyl alcohol.

References Cited in the file of this patent

UNITED STATES PATENTS

| | | |
|---|---|---|
| 2,504,682 | Harlan | Apr. 18, 1950 |
| 2,514,961 | Max | July 11, 1950 |
| 2,530,989 | Parker | Nov. 21, 1950 |
| 2,596,920 | Smith et al. | May 13, 1952 |
| 2,609,337 | Taylor et al. | Sept. 2, 1952 |
| 2,679,534 | Koontz | May 25, 1954 |
| 2,686,206 | Cerveny | Aug. 10, 1954 |

FOREIGN PATENTS

| | | |
|---|---|---|
| 660,737 | Great Britain | Nov. 14, 1951 |